(12) United States Patent
Qu et al.

(10) Patent No.: US 12,024,838 B2
(45) Date of Patent: Jul. 2, 2024

(54) EQUIPMENT FOR RIVERWAY MODEL MANUFACTURING

(71) Applicant: Changjiang River Scientific Research Institute of Changjiang Water Resources Commission, Wuhan (CN)

(72) Inventors: Geng Qu, Wuhan (CN); Dacong Yin, Wuhan (CN); Shiming Yao, Wuhan (CN); Zhengxing Yin, Wuhan (CN); Juanjuan Fang, Wuhan (CN); Jieyu Hao, Wuhan (CN); Huiyun Li, Wuhan (CN)

(73) Assignee: Changjiang River Scientific Research Institute of Changjiang Water Resources Commission (CN)

( * ) Notice: Subject to any disclaimer, the term of this patent is extended or adjusted under 35 U.S.C. 154(b) by 481 days.

(21) Appl. No.: 17/518,886

(22) Filed: Nov. 4, 2021

(65) Prior Publication Data
US 2022/0307212 A1 Sep. 29, 2022

(30) Foreign Application Priority Data
Mar. 23, 2021 (CN) .......................... 202110306861.2

(51) Int. Cl.
*E02B 1/02* (2006.01)
*B05C 19/04* (2006.01)
*B05C 19/06* (2006.01)
*F16H 19/04* (2006.01)

(52) U.S. Cl.
CPC ................ *E02B 1/02* (2013.01); *B05C 19/04* (2013.01); *B05C 19/06* (2013.01); *F16H 19/04* (2013.01)

(58) Field of Classification Search
CPC . E02B 1/02; B05C 19/04; B05C 19/06; F16H 19/04
See application file for complete search history.

(56) References Cited

U.S. PATENT DOCUMENTS
11,513,044 B2 * 11/2022 Wu ........................ G01N 33/24

FOREIGN PATENT DOCUMENTS
JP          2023016325 A   *   2/2023
WO     WO-2017166767 A1  *  10/2017  ........... G05D 1/0088
WO     WO-2022236920 A1  *  11/2022

* cited by examiner

*Primary Examiner* — Kyle Armstrong
(74) *Attorney, Agent, or Firm* — Dickinson Wright PLLC (57) ABSTRACT

The present disclosure provides equipment for riverway model manufacturing, including a framework assembly, a supply assembly, a rail driving assembly, a detection assembly, and a control device. A pipe chain conveyor is used to transport model sand into a second rail; topographic data corresponding to a riverway is input into a controller; the controller controls, according to the topographic data, a driving assembly and a supply assembly to discharge a material; meanwhile, a compaction device compacts the model sand; a detection assembly detects a height of the riverway model in real time; and after a predetermined height is achieved, manufacturing of next topography is performed. The problems that the current riverway model manufacturing has high labor cost, the model manufacturing is laborious, and the working intensity is high are solved.

10 Claims, 11 Drawing Sheets

EQUIPMENT FOR RIVERWAY MODEL MANUFACTURING

CROSS REFERENCE TO RELATED APPLICATION(S)

This patent application claims the benefit and priority of Chinese Patent Application No. 202110306861.2, filed on Mar. 23, 2021, the disclosure of which is incorporated by reference herein in its entirety as part of the present application.

TECHNICAL FIELD

The present disclosure relates to the technical field of riverway model manufacturing, and specifically relates to equipment for riverway model manufacturing.

BACKGROUND ART

A riverway model used to study the motion characteristics of water flow and sediment in river usually occupies a relatively large area, and its manufacturing process is complicated and takes relatively long time. The accuracy of a conventional mold building method cannot be guaranteed. There are usually two types of riverway models: one is a movable bed model and the other one is a fixed bed model. Most of the existing riverway models are made manually. A material used is model sand. The model sand is transported to a designated location through a pipe chain conveyor for manufacturing. The labor cost is extremely high, the model manufacturing is very laborious, and the work intensity is relatively high.

SUMMARY

The embodiments of the present disclosure provide equipment for riverway model manufacturing. A pipe chain conveyor is used to transport model sand into a second rail; topographic data corresponding to a riverway is input into a controller; the controller controls, according to the topographic data, a driving assembly and a supply assembly to discharge a material; meanwhile, a compaction device compacts the model sand; a detection assembly detects a height of the riverway model in real time; and after a predetermined height is achieved, manufacturing of next topography is performed. The problems that the current riverway model manufacturing has high labor cost, the model manufacturing is laborious, and the working intensity is high are solved.

In view of the above problems, the technical solution provided by the present disclosure is as follows.

Equipment for riverway model manufacturing includes:
a road surface rail paved on a road surface;
a framework assembly including a stand, a supporting column and a fourth hydraulic cylinder;
one end of the supporting column is hinged with one side of the stand; one end of the fourth hydraulic cylinder is hinged with one side of the supporting column; the other end of the fourth hydraulic cylinder is hinged with the bottom of the stand;
a driving assembly including a first rail, a base, a first driving motor, a first worm, a second driving motor, a second worm, a second rail, a mounting plate, a compaction device, a first gear, a second gear and a third gear;
one side of the top of the base is provided with a second through slot; one side of the base is provided with a first through slot; one side of the first through slot is provided with a groove; one side of the first rail is provided with a first tooth slot; the first rail is arranged inside the stand; the first rail penetrates through the first through slot; the second rail is arranged inside the second through slot; one side of the surface of the second rail is provided with a second tooth slot; the top of the second rail is provided with a first through hole; the first driving motor is mounted on the other side of the top of the base; the second driving motor is mounted on one side of the base close to the groove; the first worm and the first gear are sequentially arranged on one side in the base close to the second tooth slot; the first worm and the first gear are rotatably connected with the base, respectively; one end of the first worm penetrates through the top of the base and is connected with an output shaft of the first driving motor; the tooth surface of the first gear is engaged with the tooth surface of the second tooth slot and the surface of the first worm; the second gear, the second worm and the third gear are sequentially arranged inside the groove in turn; the second gear, the second worm and the third gear are rotatably connected with the groove, respectively; one end of the second worm penetrates through one side of the base and is connected with an output shaft of the second driving motor; the surface of the second worm is engaged with the tooth surface of the second gear and the tooth surface of the third gear, respectively; the tooth surface of the second gear and the tooth surface of the third gear are engaged with the first tooth slot; the mounting plate is mounted at the bottom of the second rail; the compaction device is arranged on one side of the top of the mounting plate;
a supply assembly including a closure device, a conveying pipe and a sand guide sheet;
the closure device is arranged at one end close to the mounting plate, and is used to keep an end of the first through hole close to the mounting plate in either open or closed state; one end of the conveying pipe communicates with one end of the first through hole away from the mounting plate; the sand guide sheet is slantways arranged on one side of the bottom of the mounting plate away from the compaction device;
a rail driving assembly including a fixed block, a third driving motor, a fourth gear and a driving wheel;
the top of the fixed block is hinged with the other end of the supporting column; the third driving motor, the fourth gear and the driving wheel are sequentially arranged inside the fixed block; the fourth gear and the driving wheel are rotatably connected with the fixed block, respectively; the driving wheel is in contact with the road surface rail; an output shaft of the third driving motor is fixedly connected with the fourth gear; an arc part is arranged in the middle of the driving wheel; the shape of the arc part adapts to the shape of the road surface rail; the fourth gear is engaged with one side of the driving wheel away from the arc part;
a detection assembly including a detection device shell, a first infrared ranging sensor and a second infrared ranging sensor;
the detection device shell is arranged on one side of the second rail away from the closure device; the infrared ranging sensor is arranged inside the detection device shell; the second infrared ranging sensor is arranged on one side of the fixed block;
a control device including a control box, a controller and a touch display screen. The control box is arranged on one side of the stand; the controller is arranged inside the control box; and the touch display screen is arranged on the surface of the control box.

Further, the surface of the mounting plate is provided with a second through hole, a third through hole, a fourth through hole, and a fifth through hole; the second through hole, the third through hole, and the fourth through hole are transversely disposed; and the fifth through hole communicates with the first through hole.

Further, the compaction device includes a first hydraulic cylinder, a first pressure block, a second hydraulic cylinder, a second pressure block, a third hydraulic cylinder, a third pressure block, and a pressure sheet. The first hydraulic cylinder, the second hydraulic cylinder and the third hydraulic cylinder are sequentially arranged outside the second through hole, the third through hole, and the fourth through hole; an output shaft of the first hydraulic cylinder penetrates through the second through hole and is rotatably connected with the top of the first pressure block; an output shaft of the second hydraulic cylinder penetrates through the third through hole and is rotatably connected with the top of the second pressure block; an output shaft of the third hydraulic cylinder penetrates through the fourth through hole and is rotatably connected with the top of the third pressure block; and the top of the pressure sheet is fixedly connected with the bottom of the first pressure block, the bottom of the second pressure block and the third pressure block, respectively.

Further, a material of the pressure sheet is butadiene-acrylonitrile rubber.

Further, an included angle between the sand guide sheet and the mounting plate is 45 degrees.

Further, the closure device includes a cylinder and a sealing plate. The cylinder and the sealing plate are arranged obliquely from top to bottom at an end of the second rail close to the mounting plate, and the sealing plate penetrates through the end of the second rail close to the mounting plate; the sealing plate slides inside the second rail to keep the end of the first through hole close to the mounting plate in either open or closed state; and the output end of the cylinder is connected with one side of the sealing plate.

Further, the touch display screen is communicatively connected with the controller; the signal input end of the controller is communicatively connected with the signal output terminal of the first infrared ranging sensor; the signal output end of the second infrared ranging sensor is in communication connection; and the signal output end of the controller is communicatively connected with the signal input ends of the first driving motor, the second driving motor, the third driving motor, the cylinder, the first hydraulic cylinder, the second hydraulic cylinder, the third hydraulic cylinder and the fourth hydraulic cylinder.

Further, the other end of the conveying pipe communicates with a material outlet of the pipe chain conveyor, and the pipe chain conveyor is used to convey the model sand into the conveying pipe.

Further, the conveying pipe is a corrugated pipe.

Further, four rail driving assemblies are provided; two rail driving assembly form a group; and the two groups of rail driving assemblies are respectively distributed on the surface of the road surface rail.

Compared with the existing art, the present disclosure has the beneficial effects as follows.

The pipe chain conveyor is used to transport the model sand into the first through hole; topographic data corresponding to a riverway is input into the controller; the controller controls, according to the topographic data, the driving assembly and the supply assembly to discharge a material; meanwhile, the compaction device compacts the model sand; the detection assembly detects a height of the riverway model in real time; and after a predetermined height is achieved, manufacturing of next topography is performed. The problems that the current riverway model manufacturing has high labor cost, the model manufacturing is laborious, and the working intensity is high are solved.

The foregoing description is only a summary of the technical solutions of the present disclosure. To know the technical measures of the present disclosure more clearly, the technical solutions can be implemented in accordance with the content of the specification, and to make the foregoing and other objectives, features and advantages of the present disclosure more understandable, specific implementation modes of the present disclosure are exemplified below.

REFERENCE SIGNS IN DRAWINGS

100: framework assembly; 101: stand; 102: supporting column; 103: fourth hydraulic cylinder; 200: driving assembly; 201: first rail; 20101: first tooth slot; 202: base; 2021: first through slot; 2022: second through slot; 2023: groove; 203: first driving motor; 204: first worm; 205: second driving motor; 206: second worm;

207: second rail; 20701: second tooth slot; 20702: first through hole; 208: mounting plate; 20801: second through hole; 20802: third through hole; 20803: fourth through hole; 20804: fifth through hole; 209: compaction device; 20901: first hydraulic cylinder; 20902: first pressure block; 20903: second hydraulic cylinder; 20904: second pressure block; 20905: third hydraulic cylinder; 20906: third pressure block; 20907: pressure sheet; 2010: first gear; 2011: second gear; 2012: third gear; 300: supply assembly; 301: closure device; 30101: cylinder; 30102: sealing plate; 302: conveying pipe; 303: sand guide sheet; 400: rail driving assembly; 401: fixed block; 402: third driving motor; 403: fourth gear; 404: driving wheel; 500: detection assembly; 501: detection device shell; 502: first infrared ranging sensor; 503: second infrared ranging sensor; 600: control device; 601: control box; 602: controller; 603: touch display screen; 700: pipe chain conveyor; 800: road surface rail.

Detailed Description of the Embodiments

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments.

Referring to FIG. 1 to FIG. 12, equipment for riverway model manufacturing includes a road surface rail 800 paved on a road surface and used to guide the equipment for riverway model manufacturing to move; and a framework assembly 100 including a stand 101, a supporting column 102 and a fourth hydraulic cylinder 103. One end of the supporting column 102 is hinged with one side of the stand 101; one end of the fourth hydraulic cylinder 103 is hinged with one side of the supporting column 102; the other end of the fourth hydraulic cylinder 103 is hinged with the bottom of the stand 101; the driving assembly 200 includes a first rail 201, a base 202, a first driving motor 203, a first worm 204, a second driving motor 205, a second worm 206, a second rail 207, a mounting plate 208, a compaction device 209, a first gear 2010, a second gear 2011, and a third gear 2012. One side of the top of the base 202 is provided with a second through slot 2022; one side of the base 202 is provided with a first through slot 2021; one side of the first through slot 2021 is provided with a groove 2023; one side of the first rail 201 is provided with a first tooth slot 20101; the first rail 201 is arranged inside the stand 101; the first rail 201 penetrates through the first through slot 2021; an inner wall of the first through slot 2021 is in clearance fit with an outer wall of the first rail 201; the base 202 slides left and right on the surface of the first rail 201 through the first through slot 2021; the second rail 207 is arranged inside the second through slot 2022; an inner wall of the second through slot 2022 is in clearance fit with an outer wall of the second rail 207; the second rail 207 slides up and down in the base 202 through the first through slot 2021; one side of the surface of the second rail 207 is provided with a second tooth slot 20701; the top of the second rail 207 is provided with a first through hole 20702; and the first through hole 20702 is used to store model sand conveyed by the pipe chain conveyor 700. The first driving motor 203 is mounted on the other side of the top of the base 202 and used to drive the second rail 207 to move; the second driving motor 205 is mounted on one side of the base 202 close to the groove 2023 and used to drive the base 202 to move on the first rail 201; the first worm 204 and the first gear 2010 are sequentially arranged on one side in the base 202 close to the second tooth slot 20701; and the first worm 204 and the first gear 2010 are rotatably connected with the base 202. One end of the first worm 204 penetrates through the top of the base 202 and is connected with an output shaft of the first driving motor 203; the tooth surface of the first gear 2010 is engaged with the tooth surface of the second tooth slot 20701 and the surface of the first worm 204, respectively; the second gear 2011, the second worm 206 and the third gear 2012 are sequentially arranged inside the groove 2023 in turn; and the second gear 2011, the second worm 206 and the third gear 2012 are rotatably connected with the groove 2023, respectively. One end of the second worm 206 penetrates through one side of the base 202 and is connected with an output shaft of the second driving motor 205; the surface of the second worm 206 is engaged with the tooth surface of the second gear 2011 and the tooth surface of the third gear 2012; the tooth surface of the second gear 2011 and the tooth surface of the third gear 2012 are engaged with the first tooth slot 20101, respectively; and the mounting plate 208 is mounted at the bottom of the second rail 207. The surface of the mounting plate 208 is provided with a second through hole 20801, a third through hole 20802, a fourth through hole 20803 and a fifth through hole 20804; the second through hole 20801, the third through hole 20802 and the fourth through hole 20803 are transversely arranged; and the fifth through hole 20804 communicates with the first through hole 20702 to output the mold sand. The compaction device 209 is arranged on one side of the top of the mounting plate 208. The supply assembly 300 includes a closure device 301, a conveying pipe 302 and a sand guide sheet 303. The closure device 301 is arranged at one end close to the mounting plate 208, and is used to keep an end of the first through hole 20702 close to the mounting plate 208 in either open or closed state; one end of the conveying pipe 302 communicates with one end of the first through hole 20702 away from the mounting plate 208; the sand guide sheet 303 is slantways arranged on one side of the bottom of the mounting plate 208 away from the compaction device 209; an included angle between the sand guide sheet 303 and the mounting plate 208 is 45 degrees; and the sand guide sheet 303 is used to guide the model sand in the second rail 207 to the bottom of the compaction device 209 to facilitate the compaction operation of the compaction device 209 on the model sand. The rail driving assembly 400 includes a fixed block 401, a third driving motor 402, a fourth gear 403 and a driving wheel 404; the top of the fixed block 401 is fixedly connected with the bottom of the stand 101; the third driving motor 402, the fourth gear 403 and the driving wheel 404 are sequentially arranged inside the fixed block 401; the fourth gear 403 and the driving wheel 404 are rotatably connected with the fixed block 401, respectively; an output shaft of the third driving motor 402 is fixedly connected with the fourth gear 403 an used to drive the fourth gear 403 to rotate; an arc part is arranged in the middle of the driving wheel 404; the shape of the arc part adapts to the shape of the road surface rail 800; and the fourth gear 403 is engaged with one side of the driving wheel 404 away from the arc part. Four rail driving assemblies 400 are provided; two rail driving assembly 400 form a group; and the two groups of rail driving assemblies 400 are respectively distributed on the surface of the road surface rail 800. The detection assembly 500 includes a detection device shell 501, a first infrared ranging sensor 502 and a second infrared ranging sensor 503. The detection device shell 501 is arranged on one side of the second rail 207 away from the closure device 301; the infrared ranging sensor 502 is arranged inside the detection device shell 501; and the detection end of the first infrared ranging sensor 502 faces the ground and is used to detect a height of the second rail 207 from the ground. The second infrared ranging sensor 503 is arranged on one side of the fixed block 401, and the detection end of the second infrared ranging sensor 503 faces the fixed block 401 on the other side of the road surface rail 800 and is used to detect a distance between the two groups of rail driving assemblies 400. The control device 600 includes a control box 601, a controller 602 and a touch display screen 603. The control box 601 is arranged on one side of the stand 101; the controller 602 is arranged inside the control box 601; and the touch display screen 603 is arranged on the surface of the control box 601. The pipe chain conveyor is used to transport the model sand into the second rail 207 through a conveying pipe 302; topographic data corresponding to a riverway is input into the controller 602; the controller 602 controls, according to the topographic data, the driving assembly 200 and the supply assembly 300 to discharge a material; meanwhile, the compaction device 209 compacts the model sand; the detection assembly 500 detects a height of the riverway model in real time and feeds back the height to the controller 602; and after a predetermined height is achieved, the controller 602 performs manufacturing of next topography. The problems that the current riverway model manufacturing has high labor cost, the model manufacturing is laborious, and the working intensity is high are solved.

Figure 1:
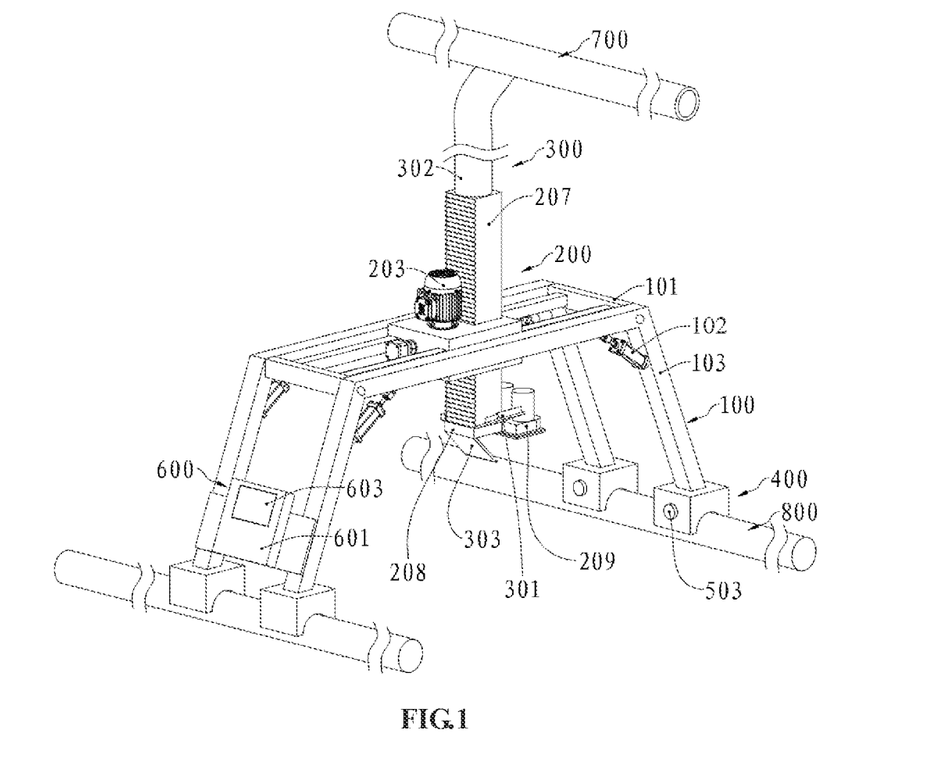
FIG. 1 is a schematic structural diagram of a positional relationship in one visual angle of a three: dimensional structure of equipment for riverway model manufacturing disclosed in the embodiments of the present disclosure.
Figure 2:
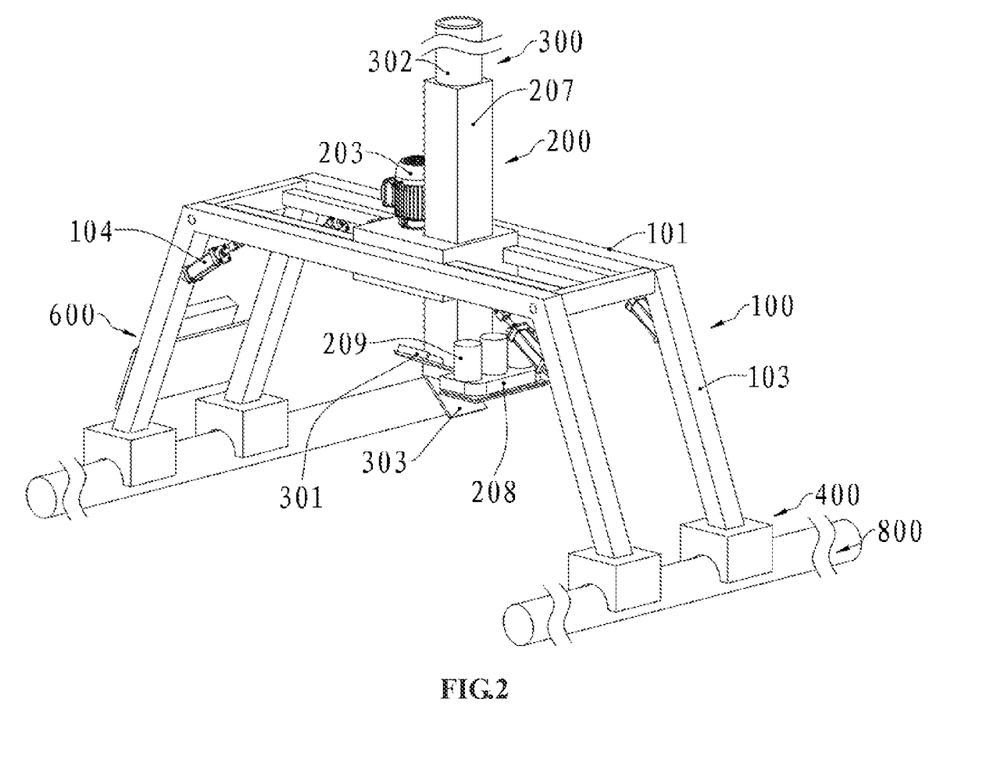
FIG. 2 is a schematic structural diagram of a positional relationship in another visual angle of a three: dimensional structure of equipment for riverway model manufacturing disclosed in the embodiments of the present disclosure.
Figure 11:
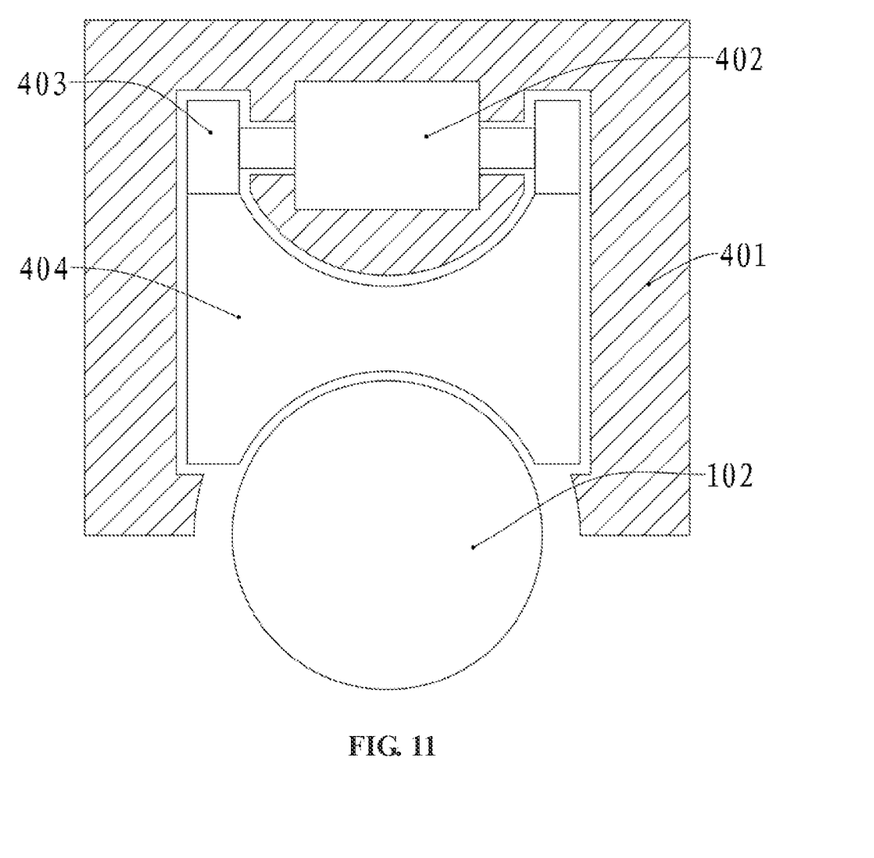
FIG. 11 is a schematic sectional structural diagram of a rail driving assembly disclosed in the embodiments of the present disclosure.

In the present embodiment, in the process that the equipment for riverway model manufacturing moves on the road surface rail 800, as the width of the rail changes, the distance between the rail driving assemblies 400 in two rails changes. When the second infrared ranging sensor 503 detects that the width is increased, the controller 602 controls the fourth hydraulic cylinder 103 to extend out, so that an opening and closing angle between the supporting column 102 and the stand 101 is increased, and an opening and closing angle between the supporting column 102 and the rail driving assembly 400 is decreased. When the second infrared ranging sensor 503 detects that the width is decreased, the controller 602 controls the fourth hydraulic cylinder 103 to retract, so that the opening and closing angle between the supporting column 102 and the stand 101 is decreased, and the opening and closing angle between the supporting column 102 and the rail driving assembly 400 is increased. The equipment for riverway model manufacturing is automatically adjusted according to the width of the road surface rail 800 to facilitate adaptation to the road surface rails 800 with different widths.

The embodiment of the present disclosure is also realized through the following technical solution.

Referring to FIGS. 1 to 3 and FIGS. 5 to 8, in the embodiment of the present disclosure, the compaction device 209 includes a first hydraulic cylinder 20901, a first pressure block 20902, a second hydraulic cylinder 20903, a second pressure block 20904, a third hydraulic cylinder 20905, a third pressure block 20906, and a pressure sheet 20907. The first hydraulic cylinder 20901, the second hydraulic cylinder 20903 and the third hydraulic cylinder 20905 are sequentially arranged outside the second through hole 20801, the third through hole 20802, and the fourth through hole 20803; an output shaft of the first hydraulic cylinder 20901 penetrates through the second through hole 20801 and is rotatably connected with the top of the first pressure block 20902; an output shaft of the second hydraulic cylinder 20903 penetrates through the third through hole 20802 and is rotatably connected with the top of the second pressure block 20904; an output shaft of the third hydraulic cylinder 20905 penetrates through the fourth through hole 20803 and is rotatably connected with the top of the third pressure block 20906; and the top of the pressure sheet 20907 is fixedly connected with the bottom of the first pressure block 20902, the bottom of the second pressure block 20904 and the third pressure block 20906, respectively. A material of the pressure sheet 20907 is butadiene-acrylonitrile rubber, which is elastic and corrosion-resistant. The controller 602 controls the compaction device 209 to compact the model sand, so that the problems that the current riverway model manufacturing has high labor cost, the model manufacturing is laborious, and the working intensity is high are solved.

Figure 7:
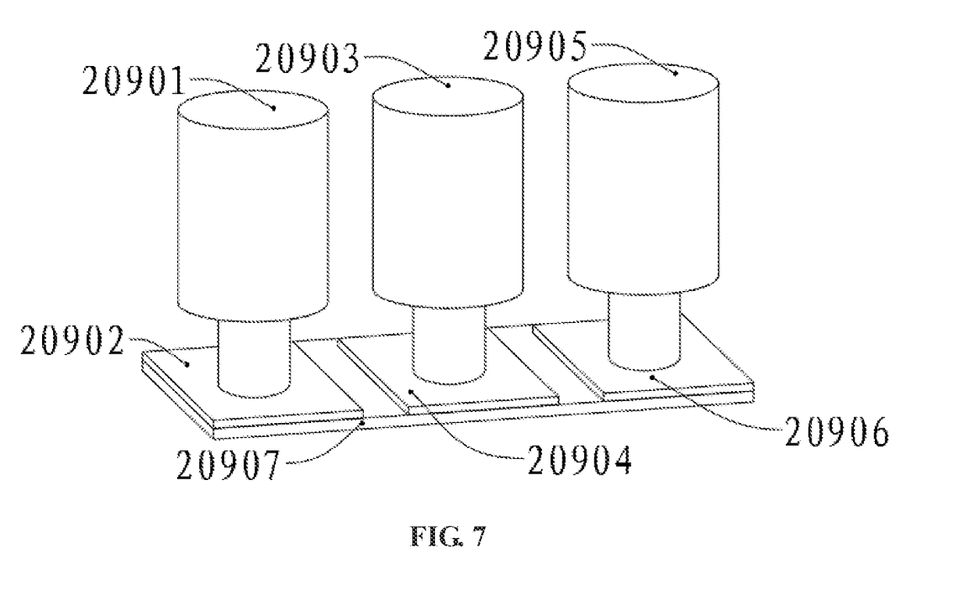
FIG. 7 is a schematic three: dimensional structural diagram of a compaction device disclosed in the embodiments of the present disclosure.

As one preferable embodiment, the controller 602 outputs the model sand through the second rail 207 according to the input topographic data; and the model sand is guided by the sand guide sheet 303 and output to a position below the compaction device 209. The controller 602 changes extending lengths of the first hydraulic cylinder 20901, the second hydraulic cylinder 20903 and the third hydraulic cylinder 20905 according to the shape of the model. For example, If the top of a cross section of the model that is being manufactured is an arc, the first hydraulic cylinder 20901, the second hydraulic cylinder 20903 and the third hydraulic cylinder 20905 are respectively adjusted, according to the radian of the arc, to extend out. The extending lengths of the first hydraulic cylinder 20901 and the third hydraulic cylinder 20905 are greater than the extending length of the second hydraulic cylinder 20903. The pressure sheet 20907 obtains an arc shape according to the positions of the first pressure block 20902, the second pressure block 20904, and the third pressure block 20906; the model sand is pressed by means of the first pressure block 20902, the second pressure block 20904, the third pressure block 20906, and the pressure sheet 20907, and becomes more compact. Meanwhile, the shape is more in line with the input topographic data. Similarly, if the top of a cross section of the model that is being manufactured is a plane, the extending lengths of the first hydraulic cylinder 20901, the second hydraulic cylinder 20903 and the third hydraulic cylinder 20905 are respectively adjusted, according to the planeness of the plane; and the pressure sheet 20907 obtains the plane according to the positions of the first pressure block 20902, the second pressure block 20904, and the third pressure block 20906. The model sand is pressed through the first pressure block 20902, the second pressure block 20904, the third pressure block 20906, and the pressure sheet 20907, so that the model sand is more compact, and the shape is more in line with the input topographic data. The manufacturing accuracy is improved. The problems that the current riverway model manufacturing has high labor cost, the model manufacturing is laborious, and the working intensity is high are solved.

Figure 8:
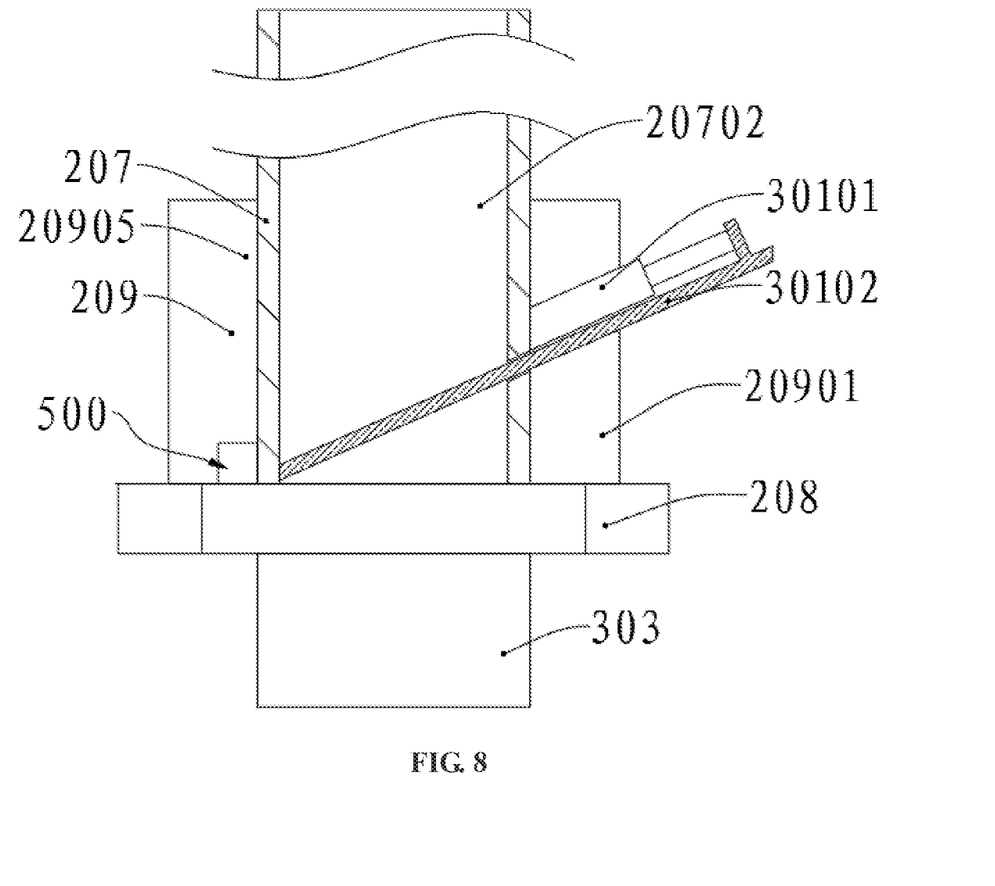
FIG. 8 is a schematic structural diagram of a supply assembly disclosed in the embodiments of the present disclosure.
Figure 9:
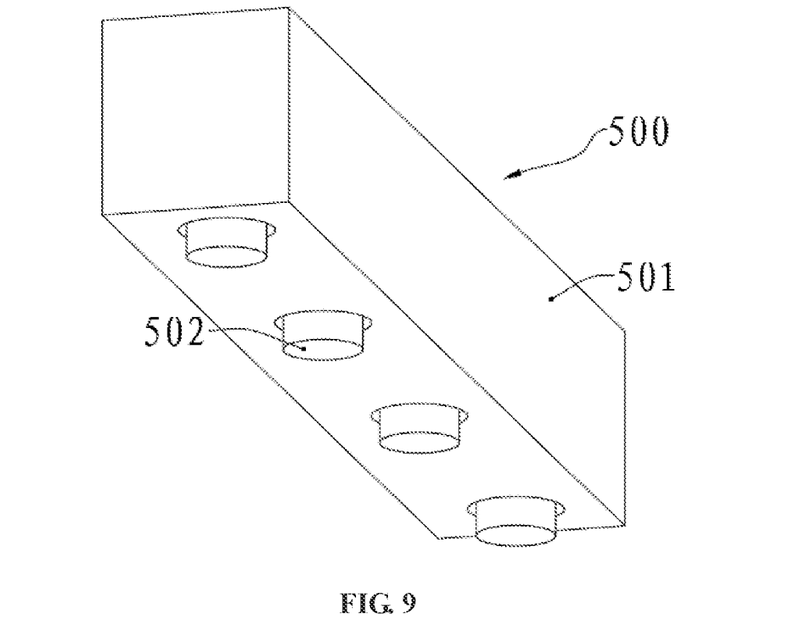
FIG. 9 is a schematic three: dimensional structural diagram of a detection assembly disclosed in the embodiments of the present disclosure.
Figure 10:
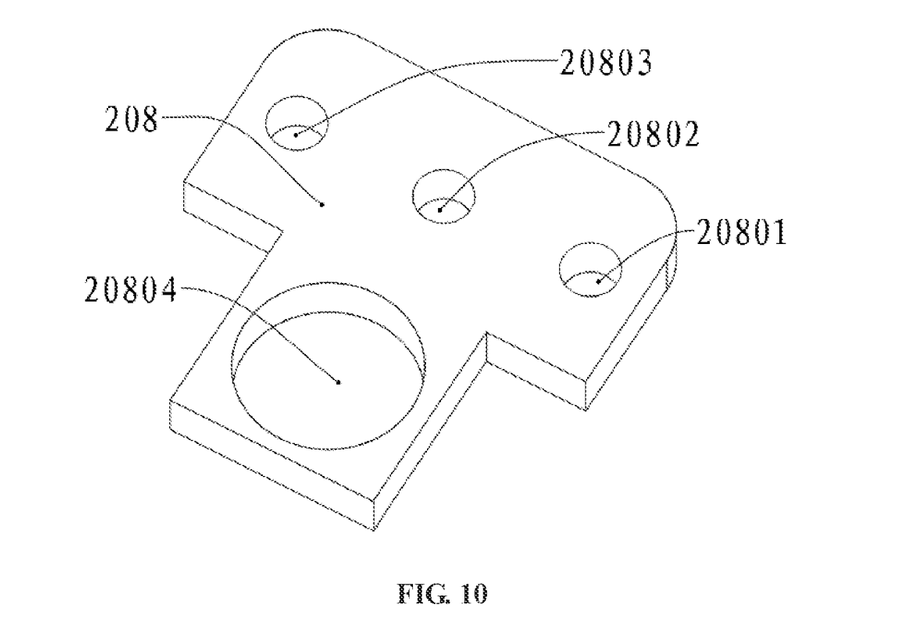
FIG. 10 is a schematic three: dimensional structural diagram of a mounting plate disclosed in the embodiments of the present disclosure.

Referring to FIGS. 1 to 3, FIGS. 5 to 6, and FIG. 8, in the embodiment of the present disclosure, the closure device 301 includes a cylinder 30101 and a sealing plate 30102; the cylinder 30101 and the sealing plate 30102 are sequentially slantways arranged on one end of the second rail 207 close to the mounting plate 208 from top to bottom; the sealing plate 30102 penetrates through the end of the second rail 207 close to the mounting plate 208; the sealing plate 30102 slides in the second rail 207 to keep one end of the first through hole 20702 close to the mounting plate 208 to be in either open or closed state; the output end of the cylinder 30101 is connected with one side of the sealing plate 30102;

and the sealing plate 30102 is adjusted to open or close the first through hole 20702 according to a manufacturing state of the riverway model.

Referring to FIGS. 1 to 3, FIGS. 5 to 8, and FIG. 11, in the embodiment of the present disclosure, the touch display screen 603 is communicatively connected with the controller 602; the signal input end of the controller 602 is communicatively connected with the signal output end of the first infrared ranging sensor 502; the signal input end of the controller 602 is communicatively connected with the signal output end of the second infrared ranging sensor 503; and the signal output end of the controller 602 is communicatively connected with the signal input ends of the first driving motor 203, the second driving motor 205, the third driving motor 402, the cylinder 30101, the first hydraulic cylinder 20901, the second hydraulic cylinder 20903, the third hydraulic cylinder 20905 and the fourth hydraulic cylinder 103.

Figure 12:
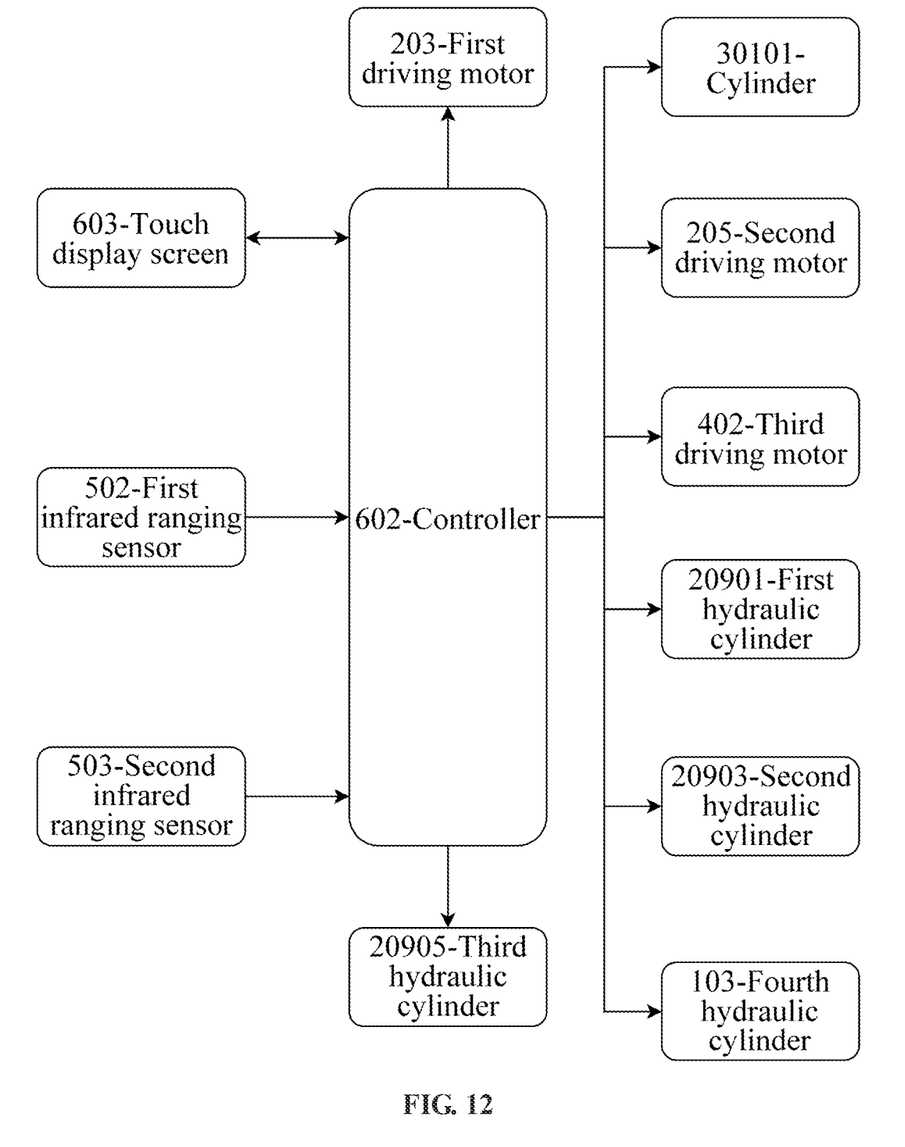
FIG. 12 is a block diagram of communicative connection of equipment for riverway model manufacturing disclosed in the embodiments of the present disclosure.

In the present embodiment, the topographic data is input into the controller 602; a manufacturing start signal is sent to the controller 602 through the touch display screen 603; the controller 602 controls, according to the topographic data, the first driving motor 203, the second driving motor 205 and the third driving motor 402 to rotate; the first driving motor 203 drives, through the first worm 204, the first gear 2010 to rotate; the first gear 2010 and the second tooth slot 20701 are engaged to drive the second rail 207 to move up and down along the inner wall of the second through slot 2022; the second driving motor 205 drives the second worm 206 to rotate; the second worm 206 is engaged with the second gear 2011 and the third gear 2012 to drive the first rail 201 to move left or right; the third driving motor 402 drives the fourth gear 403 to rotate; the fourth gear 403 drives the driving wheel 404 to rotate; the driving wheel 404 drives the equipment for riverway model manufacturing to move along a ground rail; the controller 602 controls, according to the topographic data, the cylinder 30101 to drive the sealing plate 30102 to open or close the first through hole 20702 to control the outputting of the model sand. Meanwhile, the controller 602 controls, according to the topographic data, the extending lengths of the first hydraulic cylinder 20901, the second hydraulic cylinder 20903 and the third hydraulic cylinder 20905 to compact the output model sand. The first infrared ranging sensor 502 sends a height signal of the second rail 207 from the ground to the controller 602. The controller 602 controls the height of the model according to the topographic height in the input topographic data, so that the problems that the current riverway model manufacturing has high labor cost, the model manufacturing is laborious, and the working intensity is high are solved.

Figure 3:
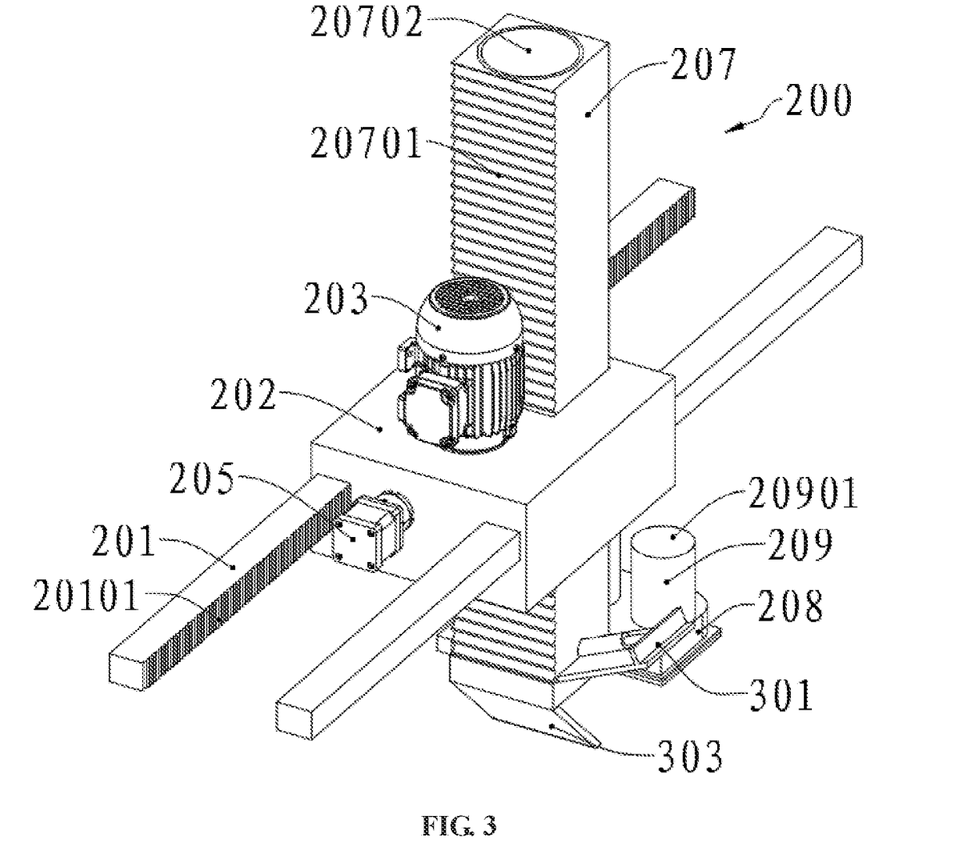
FIG. 3 is a schematic three: dimensional structural diagram of a driving assembly disclosed in the embodiments of the present disclosure.
Figure 4:
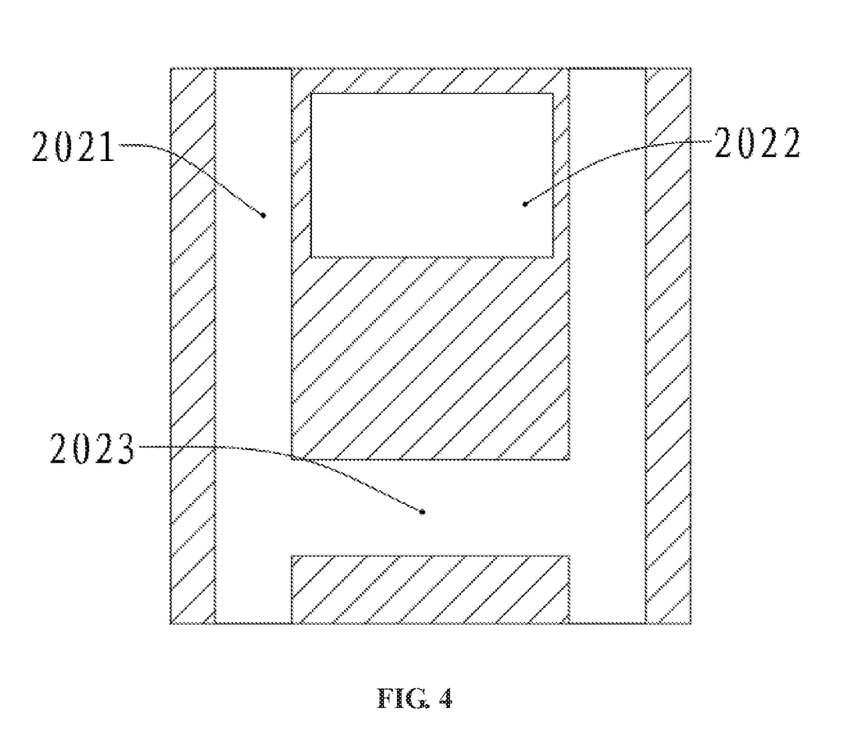
FIG. 4 is a schematic top sectional structural diagram of a base disclosed in the embodiments of the present disclosure.
Figure 5:
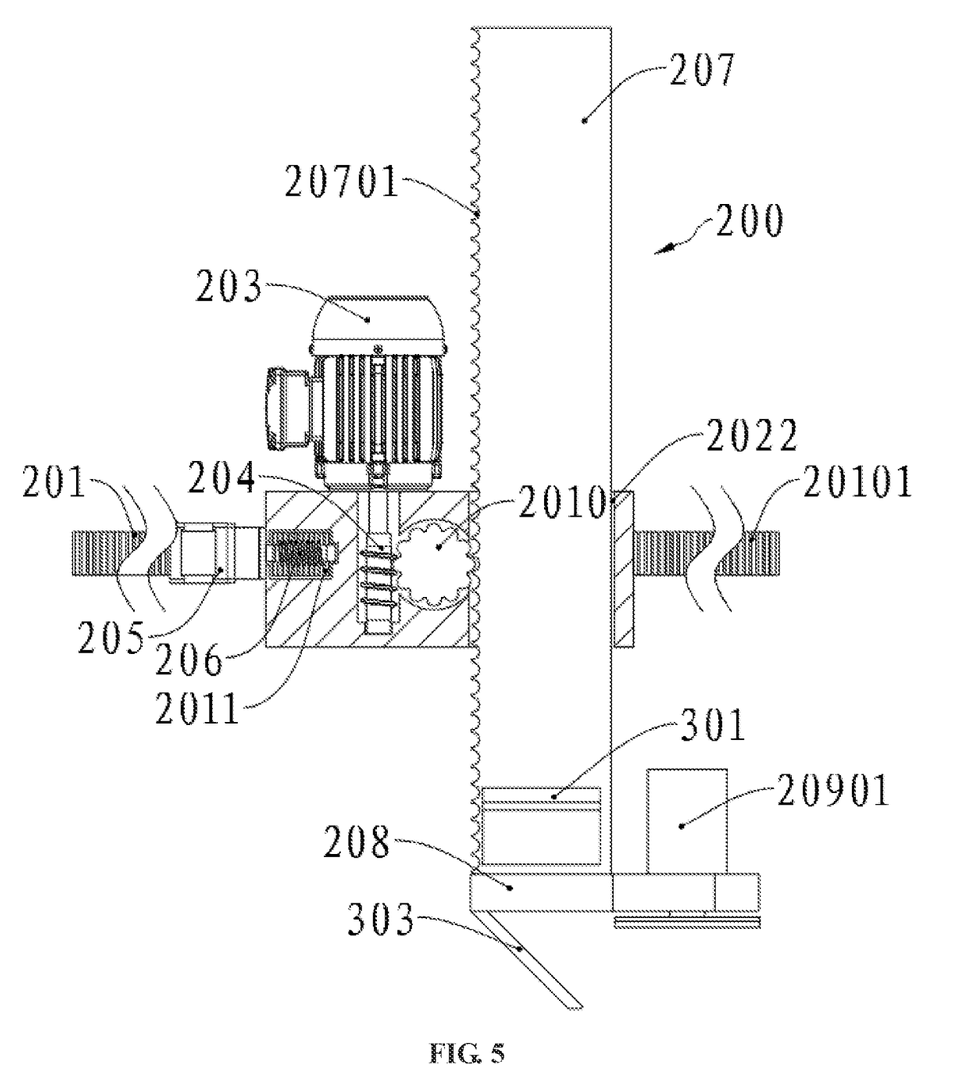
FIG. 5 is a schematic front sectional structural diagram of a driving assembly disclosed in the embodiments of the present disclosure.
Figure 6:
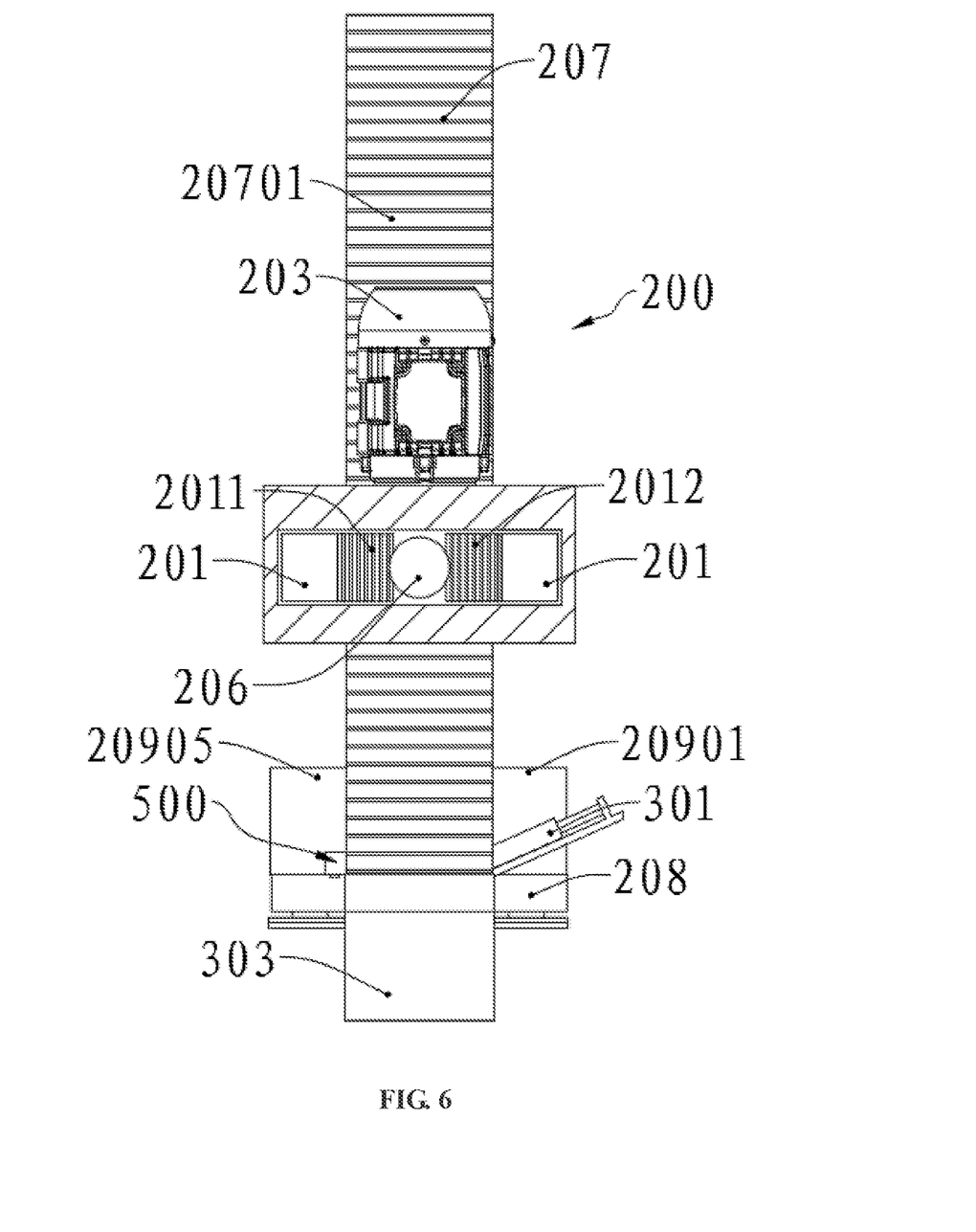
FIG. 6 is a schematic side sectional structural diagram of a driving assembly disclosed in the embodiments of the present disclosure.

Referring to FIGS. 1 to 3, in the embodiment of the present disclosure, the other end of the conveying pipe 302 communicates with a material outlet of the pipe chain conveyor 700. The pipe chain conveyor 700 is used to convey the model sand into a conveying pipe 302 that is a corrugated pipe. The conveying pipe 302 may randomly bend according to the positions of the equipment for riverway model manufacturing and the pipe chain conveyor 700, so that the reliability of the equipment for riverway model manufacturing is improved, and the problems that the current riverway model manufacturing has high labor cost, model manufacturing is laborious, and the working intensity is high are solved.

Specifically, the working principle of the equipment for riverway model manufacturing is as follows. The topographic data corresponding to the riverway is input into the controller 602; a manufacturing start signal is sent to the controller 602 through the touch display screen 603; the controller 602 controls, according to the topographic data, the first driving motor 203, the second driving motor 205 and the third driving motor 402 to rotate; the first driving motor 203 drives, through the first worm 204, the first gear 2010 to rotate; the first gear 2010 and the second tooth slot 20701 are engaged to drive the second rail 207 to move up or down along the inner wall of the second through slot 2022; the second driving motor 205 drives the second worm 206 to rotate; the second worm 206 is engaged with the second gear 2011 and the third gear 2012 to drive the first rail 201 to move left or right; the third driving motor 402 drives the fourth gear 403 to rotate; the fourth gear 403 drives the driving wheel 404 to rotate; the driving wheel 404 drives the equipment for riverway model manufacturing to move along a ground rail; the controller 602 controls the cylinder 30101 to drive the sealing plate 30102 to control the outputting of the model sand. The controller 602 controls, according to the topography in the topographic data, the extending lengths of the first hydraulic cylinder 20901, the second hydraulic cylinder 20903 and the third hydraulic cylinder 20905 in the compaction device 209; the pressure sheet 20907 obtains a corresponding shape according to the positions of the first pressure block 20902, the second pressure block 20904, and the third pressure block 20906. The first pressure block 20902, the second pressure block 20904, the third pressure block 20906, and the pressure block 20907 press the model sand, so that the model sand is more compact; meanwhile, the shape is more in line with the input topographic data; the first infrared ranging sensor 502 sends the height signal of the second rail 207 from the ground to the controller 602 in real time, and the controller 602 controls the height of the model according to the height of the topography in the topographic data, so that the problems that the current riverway model manufacturing has high labor cost, the model manufacturing is laborious, and the working intensity is high are solved.

It should be noted that specific model numbers and specifications of the first driving motor 203, the second driving motor 205, the third driving motor 402, the cylinder 30101, the first hydraulic cylinder 20901, the second hydraulic cylinder 20903, the third hydraulic cylinder 20905, the fourth hydraulic cylinder 103, the touch display screen 603, the controller 602, the first infrared ranging sensor 502 and the second infrared ranging sensor 503 need to be selected and determined according to the actual specification of the device. The specific selection calculation method uses the existing technology in the art, so descriptions thereof are omitted here.

Power supplying and principles of the first driving motor 203, the second driving motor 205, the third driving motor 402, the cylinder 30101, the first hydraulic cylinder 20901, the second hydraulic cylinder 20903, the third hydraulic cylinder 20905, the fourth hydraulic cylinder 103, the touch display screen 603, the controller 602, the first infrared ranging sensor 502, and the second infrared ranging sensor 503 are known to those skilled in the art, so descriptions thereof are omitted here.

Obviously, those skilled in the art can make various changes and modifications to the present disclosure without departing from the spirit and scope of the present disclosure. Therefore, if these changes and transformations of the present disclosure fall within the scope of the claims of the present disclosure and equivalent technologies of the present disclosure, the present disclosure is intended to include these changes and transformations.

What is claimed is:

1. Equipment for riverway model manufacturing, comprising:
   a road surface rail paved on a road surface;
   a framework assembly comprising a stand, a supporting column and a fourth hydraulic cylinder;
   one end of the supporting column is hinged with one side of the stand; one end of the fourth hydraulic cylinder is hinged with one side of the supporting column; the other end of the fourth hydraulic cylinder is hinged with the bottom of the stand;
   a driving assembly comprising a first rail, a base, a first driving motor, a first worm, a second driving motor, a second worm, a second rail, a mounting plate, a compaction device, a first gear, a second gear and a third gear;
   one side of the top of the base is provided with a second through slot; one side of the base is provided with a first through slot; one side of the first through slot is provided with a groove; one side of the first rail is provided with a first tooth slot; the first rail is arranged inside the stand; the first rail penetrates through the first through slot; the second rail is arranged inside the second through slot; one side of the surface of the second rail is provided with a second tooth slot; the top of the second rail is provided with a first through hole; the first driving motor is mounted on the other side of the top of the base; the second driving motor is mounted on one side of the base close to the groove; the first worm and the first gear are sequentially arranged on one side in the base close to the second tooth slot; the first worm and the first gear are rotatably connected with the base, respectively; one end of the first worm penetrates through the top of the base and is connected with an output shaft of the first driving motor; the tooth surface of the first gear is engaged with the tooth surface of the second tooth slot and the surface of the first worm; the second gear, the second worm and the third gear are sequentially arranged inside the groove in turn; the second gear, the second worm and the third gear are rotatably connected with the groove, respectively; one end of the second worm penetrates through one side of the base and is connected with an output shaft of the second driving motor; the surface of the second worm is engaged with the tooth surface of the second gear and the tooth surface of the third gear, respectively; the tooth surface of the second gear and the tooth surface of the third gear are engaged with the first tooth slot; the mounting plate is mounted at the bottom of the second rail; the compaction device is arranged on one side of the top of the mounting plate;
   a supply assembly comprising a closure device, a conveying pipe and a sand guide sheet;
   the closure device is arranged at one end close to the mounting plate, and is used to keep an end of the first through hole close to the mounting plate in either open or closed state; one end of the conveying pipe communicates with one end of the first through hole away from the mounting plate; the sand guide sheet is slantways arranged on one side of the bottom of the mounting plate away from the compaction device;
   a rail driving assembly comprising a fixed block, a third driving motor, a fourth gear and a driving wheel;
   the top of the fixed block is hinged with the other end of the supporting column; the third driving motor, the fourth gear and the driving wheel are sequentially arranged inside the fixed block; the fourth gear and the driving wheel are rotatably connected with the fixed block, respectively; the driving wheel is in contact with the road surface rail; an output shaft of the third driving motor is fixedly connected with the fourth gear; an arc part is arranged in the middle of the driving wheel; the shape of the arc part adapts to the shape of the road surface rail; the fourth gear is engaged with one side of the driving wheel away from the arc part;
   a detection assembly comprising a detection device shell, a first infrared ranging sensor and a second infrared ranging sensor;
   the detection device shell is arranged on one side of the second rail away from the closure device; the infrared ranging sensor is arranged inside the detection device shell; the second infrared ranging sensor is arranged on one side of the fixed block;
   a control device comprising a control box, a controller and a touch display screen, wherein the control box is arranged on one side of the stand, the controller is arranged inside the control box, and the touch display screen is arranged on the surface of the control box.

2. The equipment for riverway model manufacturing according to claim 1, wherein the surface of the mounting plate is provided with a second through hole, a third through hole, a fourth through hole, and a fifth through hole; the second through hole, the third through hole, and the fourth through hole are transversely disposed; and the fifth through hole communicates with the first through hole.

3. The equipment for riverway model manufacturing according to claim 2, wherein the compaction device comprises a first hydraulic cylinder, a first pressure block, a second hydraulic cylinder, a second pressure block, a third hydraulic cylinder, a third pressure block, and a pressure sheet; the first hydraulic cylinder, the second hydraulic cylinder and the third hydraulic cylinder are sequentially arranged outside the second through hole, the third through hole, and the fourth through hole; an output shaft of the first hydraulic cylinder penetrates through the second through hole and is rotatably connected with the top of the first pressure block; an output shaft of the second hydraulic cylinder penetrates through the third through hole and is rotatably connected with the top of the second pressure block; an output shaft of the third hydraulic cylinder penetrates through the fourth through hole and is rotatably connected with the top of the third pressure block; and the top of the pressure sheet is fixedly connected with the bottom of the first pressure block, the bottom of the second pressure block and the third pressure block, respectively.

4. The equipment for riverway model manufacturing according to claim 3, wherein a material of the pressure sheet is butadiene-acrylonitrile rubber.

5. The equipment for riverway model manufacturing according to claim 3, wherein the closure device comprises a cylinder and a sealing plate; the cylinder and the sealing plate are arranged obliquely from top to bottom at an end of the second rail close to the mounting plate, and the sealing plate penetrates through the end of the second rail close to the mounting plate; the sealing plate slides inside the second rail to keep the end of the first through hole close to the mounting plate in either open or closed state; and the output end of the cylinder is connected with one side of the sealing plate.

6. The equipment for riverway model manufacturing according to claim 5, wherein the touch display screen is communicatively connected with the controller; the signal input end of the controller is communicatively connected with the signal output end of the first infrared ranging sensor; the signal output end of the second infrared ranging sensor is in communication connection; and the signal output end of the controller is communicatively connected with the signal input ends of the first driving motor, the second driving motor, the third driving motor, the cylinder, the first hydraulic cylinder, the second hydraulic cylinder, the third hydraulic cylinder and the fourth hydraulic cylinder.

7. The equipment for riverway model manufacturing according to claim 1, wherein an included angle between the sand guide sheet and the mounting plate is 45 degrees.

8. The equipment for riverway model manufacturing according to claim 1, wherein the other end of the conveying pipe communicates with a material outlet of the pipe chain conveyor, and the pipe chain conveyor is used to convey the model sand into the conveying pipe.

9. The equipment for riverway model manufacturing according to claim 1, wherein the conveying pipe is a corrugated pipe.

10. The equipment for riverway model manufacturing according to claim 1, wherein four rail driving assemblies are provided; two rail driving assembly form a group; and the two groups of rail driving assemblies are respectively distributed on the surface of the road surface rail.

* * * * *